US012785732B2

(12) United States Patent
Park et al.

(10) Patent No.: US 12,785,732 B2
(45) Date of Patent: Nov. 3, 2026

(54) COMMON MODE IMPEDANCE TUNING FOR RADIO-FREQUENCY AMPLIFIERS

(71) Applicant: Apple Inc., Cupertino, CA (US)

(72) Inventors: Jong Seok Park, San Diego, CA (US); Youngchang Yoon, San Diego, CA (US); Morteza Nick, San Diego, CA (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 18/812,830

(22) Filed: Aug. 22, 2024

(65) Prior Publication Data

US 2026/0058678 A1 Feb. 26, 2026

(51) Int. Cl.
*H04B 1/04* (2006.01)

(52) U.S. Cl.
CPC ......... *H04B 1/04* (2013.01); *H04B 2001/045* (2013.01)

(58) Field of Classification Search
None
See application file for complete search history.

(56) References Cited

U.S. PATENT DOCUMENTS 7,616,000 B2 11/2009 Chu et al.
8,149,955 B2 4/2012 Tired
8,922,282 B2 12/2014 Paul et al.
9,923,530 B2 3/2018 Kao et al.
10,862,500 B1 * 12/2020 Pelliconi ................ H03M 1/66
2004/0246039 A1 12/2004 Hsiao et al.
2007/0024377 A1 2/2007 Wang et al.
2008/0079496 A1 * 4/2008 Thompson ............. H03F 3/602
330/301
2012/0262236 A1 10/2012 Shirai
(Continued)

FOREIGN PATENT DOCUMENTS

CN 102315856 A * 1/2012 ............... H04B 1/16
CN 116979906 A * 10/2023 ........... H03F 1/0211
(Continued)

OTHER PUBLICATIONS

Yook et al., CMOSW-Band Amplifier with Tunable Neutralization Using a Cross-Coupled MOS-varactor Pair, Electronics (Year: 2019).*

*Primary Examiner* — Mohammed Rachedine
(74) *Attorney, Agent, or Firm* — Treyz Law Group; Jason Tsai

(57) ABSTRACT

Wireless circuitry is provided that includes an antenna and a radio-frequency amplifier coupled to the antenna. The radio-frequency amplifier can include a first input transistor having a drain terminal coupled to a first node, a second input transistor having a drain terminal coupled to a second node, and a common mode impedance tuning circuit coupled between the first and second nodes. The common mode impedance tuning circuit can be configured to tune a common mode impedance at the first and second nodes of the radio-frequency amplifier. The common mode impedance tuning circuit can be configured to provide a first common mode impedance when the amplifier is operating in accordance with a first set of operating conditions and can be configured to provide a second common mode impedance, different than the first common mode impedance, when the amplifier is operating in accordance with a second set of operating conditions.

16 Claims, 5 Drawing Sheets

(56) References Cited

U.S. PATENT DOCUMENTS

| | | | | |
|---|---|---|---|---|
| 2016/0241211 | A1* | 8/2016 | Hassan | H03F 3/45632 |
| 2023/0093489 | A1 | 3/2023 | Lin | |
| 2023/0283250 | A1* | 9/2023 | Uberti | H03F 3/45704 330/252 |
| 2025/0105786 | A1* | 3/2025 | Elaasar | H03B 5/1212 |

FOREIGN PATENT DOCUMENTS

| | | | | |
|---|---|---|---|---|
| CN | 118740073 | A * | 10/2024 | H03F 3/68 |
| WO | WO-2022072118 | A1 * | 4/2022 | H03M 1/0863 |

* cited by examiner

COMMON MODE IMPEDANCE TUNING FOR RADIO-FREQUENCY AMPLIFIERS

FIELD

This disclosure relates generally to electronic devices, including electronic devices with wireless communications circuitry.

BACKGROUND

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

Radio-frequency signals transmitted by an antenna are often fed through one or more power amplifiers, which are configured to amplify low power analog signals to higher power signals more suitable for transmission through the air over long distances. It can be challenging to design a satisfactory power amplifier for an electronic device.

SUMMARY

An aspect of the disclosure provides wireless circuitry that includes an antenna and a radio-frequency amplifier coupled to the antenna. The radio-frequency amplifier include a first input transistor having a drain terminal coupled to a first node, a second input transistor having a drain terminal coupled to a second node, and a common mode impedance tuning circuit coupled between the first and second nodes, where the common mode impedance tuning circuit is configured to tune a common mode impedance at the first and second nodes. The wireless circuitry can further include a transformer based output network coupled between the antenna and the radio-frequency amplifier. The transformer based output network can include one or more first coils having a first terminal coupled to the first node and having a second terminal coupled to the second node and one or more second coils having a first terminal coupled to the antenna and having a second terminal coupled to a ground power supply line.

The common mode impedance tuning circuit can include a first capacitor having a first terminal coupled to the first node and having a second terminal coupled to a tail node, a second capacitor having a first terminal coupled to the second node and having a second terminal coupled to the tail node, and a switch coupled between the tail node and a power supply line. The common mode impedance tuning circuit can be configured to operate in a first state when the radio-frequency amplifier is configured to process radio-frequency signals using a first wireless modulation scheme and to operate in a second state, different than the first state, when the radio-frequency amplifier is configured to process radio-frequency signals using a second wireless modulation scheme different than the first wireless modulation scheme.

An aspect of the disclosure provides a radio-frequency amplifier that includes a first input transistor configured to receive a radio-frequency signal, a second input transistor configured to receive the radio-frequency signal, a first impedance tuning component coupled to a first output node of the radio-frequency amplifier, a second impedance tuning component coupled to a second output node of the radio-frequency amplifier, and a switch coupled to a tail node disposed between the first impedance tuning component and the second impedance tuning component. The first impedance tuning component can include a first capacitor coupled between the first output node and the tail node, whereas the second impedance tuning component can include a second capacitor coupled between the second output node and the tail node. The switch can be selectively activated when the radio-frequency amplifier is configured to process signals in accordance with a first set of wireless modulation schemes and can be selectively deactivated when the radio-frequency amplifier is configured to process signals in accordance with a second set of wireless modulation schemes different than the first set of wireless modulation schemes.

An aspect of the disclosure provides an amplifier that includes a first input transistor coupled to a first output node, a second input transistor coupled to a second output node, and a common mode impedance tuning circuit configured to provide a first common mode impedance to the first and second output nodes when the amplifier is operating under a first set of operating conditions and to provide a second common mode impedance, different than the first common mode impedance, to the first and second output nodes when the amplifier is operating under a second set of operation conditions different than the first set of operating conditions.

An aspect of the disclosure provides an amplifier that includes a first input transistor coupled to a first output node, a second input transistor coupled to a second output node, and a common mode impedance tuning circuit coupled between the first output node and the second output node. The common mode impedance tuning circuit is configured to provide a first amplitude modulation to amplitude modulation (AMAM) response when the amplifier is operating in a first mode and to provide a second amplitude modulation to amplitude modulation (AMAM) response, different than the first AMAM response, when the amplifier is operating in a second mode. During the first mode, the amplifier can be configured to process radio-frequency signals using a first set of wireless modulation schemes. During the second mode, the amplifier can be configured to process radio-frequency signals using a second set of wireless modulation schemes different than the first set of wireless modulation schemes. The first set of wireless modulation schemes can include one or more of: quadrature phase shift keying (QPSK), binary phase shift keying (BPSK), and 8-quadrature amplitude modulation (8-QAM). The second set of wireless modulation schemes can include one or more of: 64-quadrature amplitude modulation (64-QAM), 128-quadrature amplitude modulation (128-QAM), 256-quadrature amplitude modulation (256-QAM), 512-quadrature amplitude modulation (512-QAM), and 1024-quadrature amplitude modulation (1024-QAM). The common mode impedance tuning circuit can include a switch coupled to a virtual ground node in the amplifier, where the switch is selectively deactivated in the first mode and is selectively activated in the second mode. When the switch is deactivated in the first mode, the first AMAM response can exhibit peaking. When the switch is activated in the second mode, the second AMAM response can exhibit less peaking or a flatter response relative to the first AMAM response.

An aspect of the disclosure provides an amplifier that includes a first input transistor coupled to a first output node, a second input transistor coupled to a second output node, and a common mode impedance tuning circuit coupled between the first output node and the second output node, where the common mode impedance tuning circuit is configured to provide a first amplitude modulation to phase modulation (AMPM) response when the amplifier is operating in a first mode and to provide a second amplitude modulation to phase modulation (AMPM) response, different than the first AMPM response, when the amplifier is operating in a second mode. During the first mode, the amplifier can be configured to process radio-frequency signals using a first set of wireless modulation schemes. During the second mode, the amplifier can be configured to process radio-frequency signals using a second set of wireless modulation schemes different than the first set of wireless modulation schemes. The first set of wireless modulation schemes can include one or more of: quadrature phase shift keying (QPSK), binary phase shift keying (BPSK), and 8-quadrature amplitude modulation (8-QAM), whereas the second set of wireless modulation schemes can include one or more of: 64-quadrature amplitude modulation (64-QAM), 128-quadrature amplitude modulation (128-QAM), 256-quadrature amplitude modulation (256-QAM), 512-quadrature amplitude modulation (512-QAM), and 1024-quadrature amplitude modulation (1024-QAM).

An aspect of the disclosure provides an amplifier that includes a first input transistor coupled to a first output node, a second input transistor coupled to a second output node, and a common mode impedance tuning circuit coupled between the first output node and the second output node, where the common mode impedance tuning circuit is configured to provide a first non-linear distortion response when the amplifier is operating under a first condition and to provide a second non-linear distortion response, different than the first non-linear response, when the amplifier is operating under a second condition different than the first condition.

DETAILED DESCRIPTION

Figure 1:
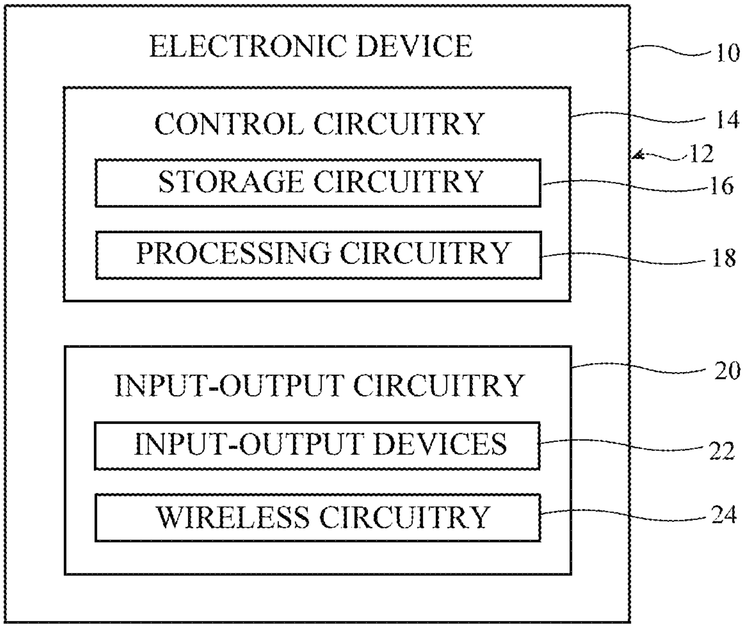
FIG. 1 is a diagram of an illustrative electronic device having wireless circuitry in accordance with some embodiments.

An electronic device such as electronic device 10 of FIG. 1 may be provided with wireless circuitry that includes radio-frequency amplifiers. A radio-frequency amplifier can be operable using various modulation schemes. Different modulations schemes prefer different amplitude modulation to amplitude modulation (AMAM) and amplitude modulation to phase modulation responses. As such, a radio-frequency amplifier can be provided with a common mode impedance tuning circuit for tuning a common mode impedance for the amplifier. The common mode impedance tuning circuit can include a switch coupled to a common node, and the common node can be coupled to amplifier output terminals via respective capacitors. The switch can be selectively activated and deactivated to modulate a common mode impedance at the output terminals of the amplifier depending on the current modulation scheme. A radio-frequency amplifier configured and operated in this way can be technically advantageous and beneficial to engineering the proper AMAM/AMPM response, thus improving the error vector magnitude (EVM) and the overall performance of the wireless circuitry.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed from plastic, glass, ceramics, fiber composites, metal (e.g., stainless steel, aluminum, metal alloys, etc.), other suitable materials, or a combination of these materials. In some embodiments, parts or all of housing 12 may be formed from dielectric or other low-conductivity material (e.g., glass, ceramic, plastic, sapphire, etc.). In other embodiments, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using the antenna(s).

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), cellular sidebands, 6G bands between 100-1000 GHz (e.g., sub-THz, THz, or THF bands), etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Figure 2:
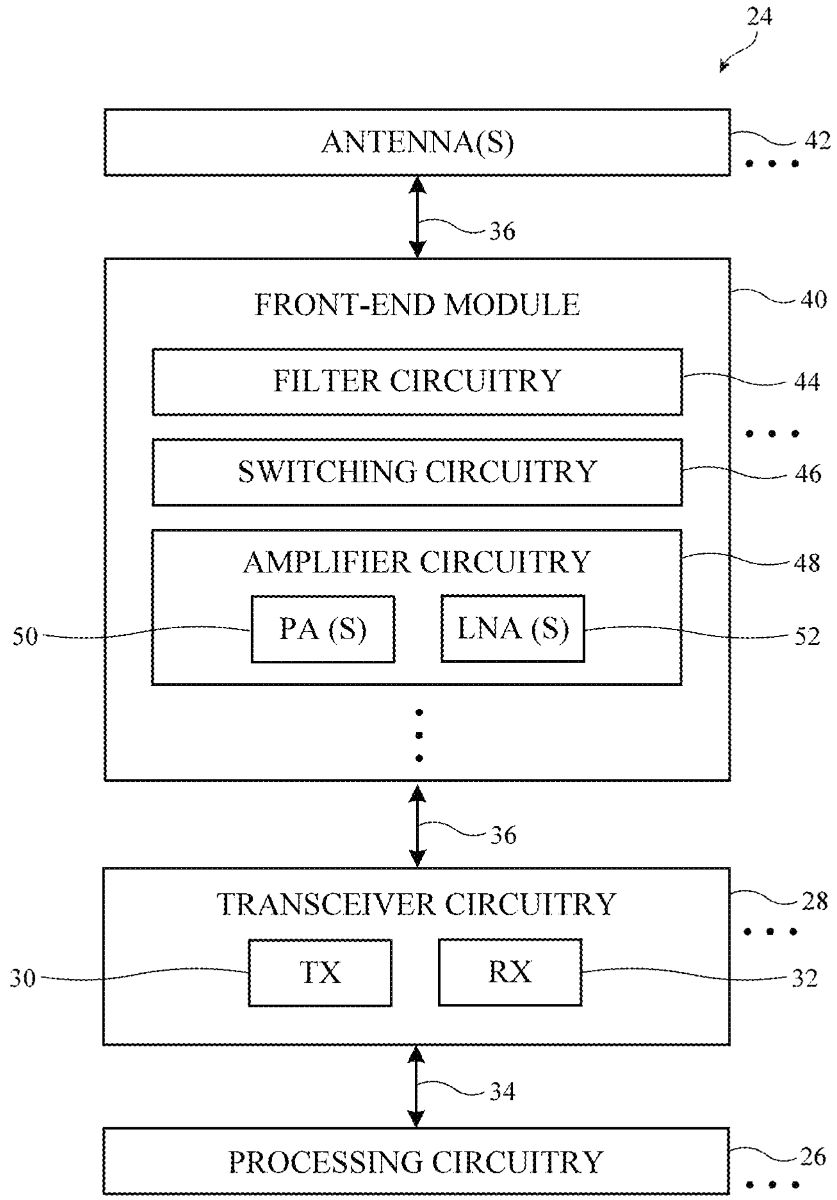
FIG. 2 is a diagram of illustrative wireless circuitry that includes amplifier circuitry in accordance with some embodiments.

FIG. 2 is a diagram showing illustrative components within wireless circuitry 24. As shown in FIG. 2, wireless circuitry 24 may include processing circuitry such as processing circuitry 26, radio-frequency (RF) transceiver circuitry such as radio-frequency transceiver 28, radio-frequency front-end circuitry such as radio-frequency front-end module (FEM) 40, and antenna(s) 42. Processing circuitry 26 may be coupled to transceiver 28 over baseband path 34. Transceiver 28 may be coupled to antenna 42 via radio-frequency transmission line path 36. Radio-frequency front-end module 40 may be disposed on radio-frequency transmission line path 36 between transceiver 28 and antenna 42.

In the example of FIG. 2, wireless circuitry 24 is illustrated as including only a single processing unit 26, a single transceiver 28, a single front-end module 40, and a single antenna 42 for the sake of clarity. In general, wireless circuitry 24 may include any desired number of baseband processors 26, any desired number of transceivers 28, any desired number of front-end modules 40, and any desired number of antennas 42. Each processing unit 26 may be coupled to one or more transceiver 28 over respective baseband paths 34. Each transceiver 28 may include a transmitter (TX) circuit 30 configured to output uplink signals to antenna 42, may include a receiver (RX) circuit 32 configured to receive downlink signals from antenna 42, and may be coupled to one or more antennas 42 over respective radio-frequency transmission line paths 36. Each radio-frequency transmission line path 36 may have a respective front-end module 40 disposed thereon. If desired, two or more front-end modules 40 may be disposed on the same radio-frequency transmission line path 36. If desired, one or more of the radio-frequency transmission line paths 36 in wireless circuitry 24 may be implemented without any front-end module disposed thereon.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is merely illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include transmission lines that are used to route radio-frequency antenna signals within device 10 (FIG. 1). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 36 may be integrated into rigid and/or flexible printed circuit boards.

In performing wireless transmission, processing circuitry 26 may provide baseband signals to transceiver 28 over baseband path 34. Transceiver 28 may further include circuitry for converting the baseband signals received from processing circuitry 26 into corresponding radio-frequency signals. For example, transceiver circuitry 28 may include mixer circuitry for up-converting (or modulating) the baseband signals to radio-frequencies prior to transmission over antenna 42. Transceiver circuitry 28 may also include digital-to-analog converter (DAC) and/or analog-to-digital converter (ADC) circuitry for converting signals between digital and analog domains. Transceiver 28 may use transmitter (TX) 30 to transmit the radio-frequency signals over antenna 42 via radio-frequency transmission line path 36 and front-end module 40. Antenna 42 may transmit the radio-frequency signals to external wireless equipment by radiating the radio-frequency signals into free space.

In performing wireless reception, antenna 42 may receive radio-frequency signals from the external wireless equipment. The received radio-frequency signals may be conveyed to transceiver 28 via radio-frequency transmission line path 36 and front-end module 40. Transceiver 28 may include circuitry such as receiver (RX) 32 for receiving signals from front-end module 40 and for converting the received radio-frequency signals into corresponding baseband signals. For example, transceiver 28 may include mixer circuitry for down-converting (or demodulating) the received radio-frequency signals to baseband frequencies prior to conveying the received signals to processing circuitry 26 over baseband path 34.

Front-end module (FEM) 40 may include radio-frequency front-end circuitry that operates on the radio-frequency signals conveyed (transmitted and/or received) over radio-frequency transmission line path 36. FEM 40 may, for example, include front-end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifier circuits 50 and/or one or more low-noise amplifier circuits 52), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other desired circuitry that operates on the radio-frequency signals transmitted and/or received by antenna 42. Each of the front-end module components may be mounted to a common (shared) substrate such as a rigid printed circuit board substrate or flexible printed circuit substrate. If desired, the various front-end module components may also be integrated into a single integrated circuit chip.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Transceiver 28 may be separate from front-end module 40. For example, transceiver 28 may be formed on another substrate such as the main logic board of device 10, a rigid printed circuit board, or flexible printed circuit that is not a part of front-end module 40. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processing circuitry 26 and/or portions of transceiver 28 (e.g., a host processor on transceiver 28) may form a part of control circuitry 14. Control circuitry 14 (e.g., portions of control circuitry 14 formed on processing circuitry 26, portions of control circuitry 14 formed on transceiver 28, and/or portions of control circuitry 14 that are separate from wireless circuitry 24) may provide control signals (e.g., over one or more control paths in device 10) that control the operation of front-end module 40.

Transceiver circuitry 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 42 may be arranged into one or more phased antenna arrays (e.g., for conveying radio-frequency signals at millimeter wave frequencies). Parasitic elements may be included in antenna 42 to adjust antenna performance. Antenna 42 may be provided with a conductive cavity that backs the antenna resonating element of antenna 42 (e.g., antenna 42 may be a cavity-backed antenna such as a cavity-backed slot antenna).

As described above, front-end module 40 may include one or more power amplifiers (PA) circuits 50 in the transmit (uplink) path. A power amplifier 50 (sometimes referred to as radio-frequency power amplifier circuitry, transmit amplifier circuitry, or amplifier circuitry) may be configured to amplify a radio-frequency signal without changing the signal shape, format, or modulation. Power amplifier 50 may, for example, be used to provide 10 dB of gain, 20 dB of gain, 10-20 dB of gain, less than 20 dB of gain, more than 20 dB of gain, or other suitable amounts of gain.

Figure 3:
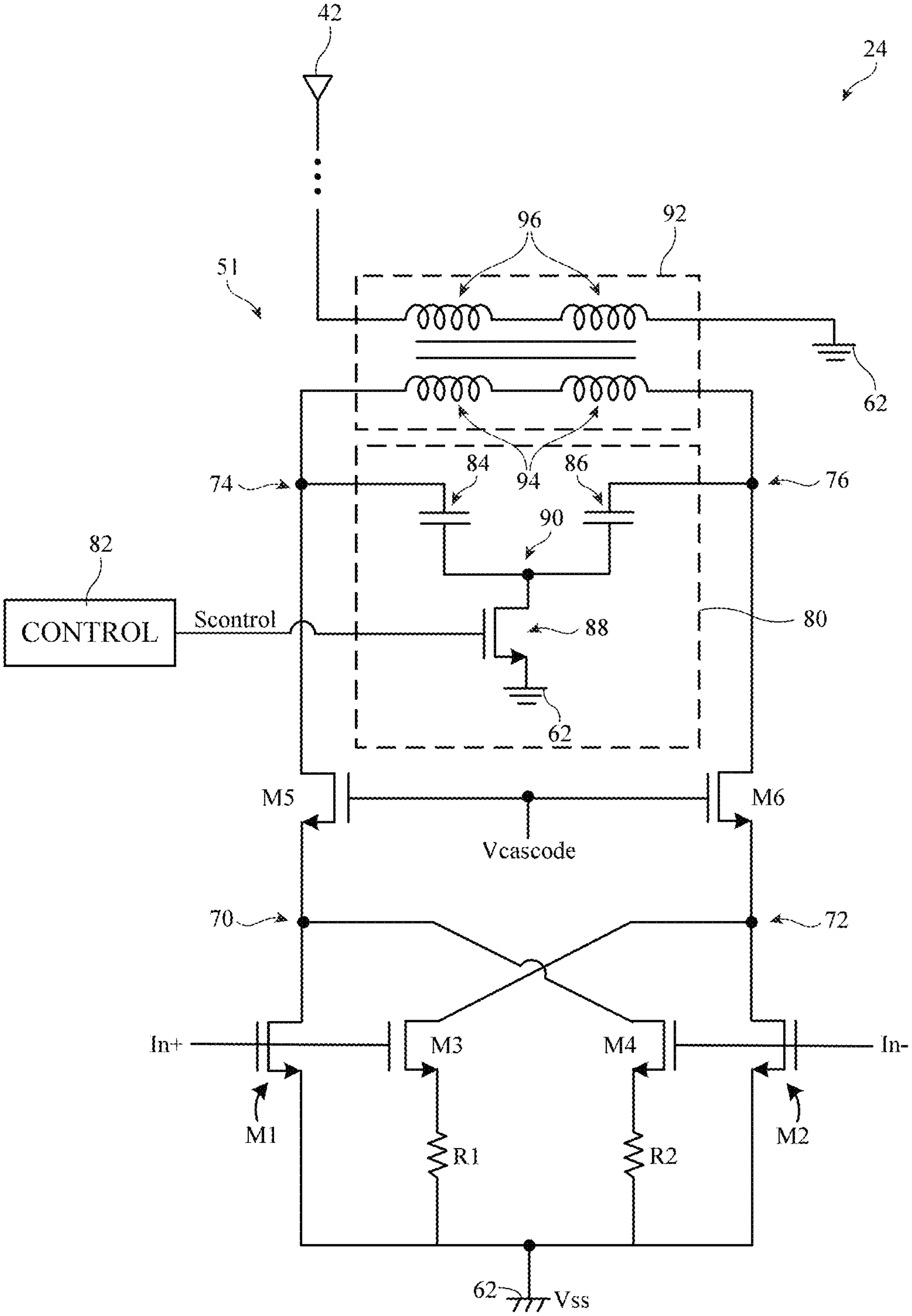
FIG. 3 is a circuit diagram of an illustrative amplifier coupled to an antenna in accordance with some embodiments.

FIG. 3 is a circuit diagram of an illustrative amplifier 51 coupled to an antenna 42 in accordance with some embodiments. Amplifier 51 can represent a transmitting amplifier 50 of the type described in connection with FIG. 2, a receiving amplifier 52 of the type described in connection with FIG. 2, or other types of radio-frequency amplifier. Amplifier 51 can sometimes be referred to herein as an amplifier circuit, amplifier circuitry, amplifier stage, or radio-frequency amplifying circuit. As shown in FIG. 3, amplifier 51 may include transistors M1, M2, M3, M4, M5, and M6 and resistors R1 and R2. Transistors M1-M6 may be n-type (n-channel) transistors such as n-type metal-oxide-semiconductor (NMOS) devices. Transistor M1 may have a source terminal coupled to a ground power supply line 62 (e.g., a ground line on which ground power supply voltage Vss is provided), a drain terminal, and a gate terminal coupled to a positive input terminal In+. Transistor M2 may have a source terminal coupled to ground power supply line 62, a drain terminal, and a gate terminal coupled to a negative input terminal In−. Input terminals In+ and In− serve collectively as the differential input port of amplifier 51 for receiving a radio-frequency signal, so transistors M1 and M2 are sometimes referred to as the "input" transistors.

The terms "source" and "drain" terminals used to refer to current-conveying terminals in a transistor may be used interchangeably and are sometimes referred to as "source-drain" terminals. Thus, the source terminal of transistor M1 can thus sometimes be referred to as a first source-drain terminal, and the drain terminal of transistor M1 can be referred to as a second source-drain terminal (or vice versa). The term "activate" with respect to a switch (or transistor) may refer to or be defined herein as an action that places the switch in an "on" or low-impedance state such that the two terminals of the switch are electrically connected to conduct current. Activating a switch can sometimes be referred to as turning on or closing a switch. The term "deactivate" with respect to a switch (or transistor) may refer to or be defined herein as an action that places the switch in an "off" or high-impedance state such that the two terminals of the switch/transistor are electrically disconnected with minimal leakage current. Deactivating a switch can sometimes be referred to as turning off or opening a switch.

Transistor M3 may have a source terminal coupled to ground power supply line 62 via resistor R1, a gate terminal coupled to positive input terminal In+, and a drain terminal cross-coupled to the drain terminal of input transistor M2. Transistor M4 may have a source terminal coupled to ground power supply line 62 via resistor R2, a gate terminal coupled to negative input terminal In−, and a drain terminal cross-coupled to the drain terminal of input transistor M1. Configured in this way, cross-coupled transistors M3 and M4 can be used to neutralize the gate-to-drain parasitic capacitance of input transistors M1 and M2 and are therefore sometimes referred to as parasitic capacitance "neutralization" transistors. Resistors R1 and R2 are sometimes referred to as source resistors. The use of parasitic capacitance neutralization transistors M3 and M4 (and the corresponding source resistors R1 and R2) are optional.

Transistor M5 may have a source terminal coupled to the drain terminal of input transistor M1, a gate terminal configured to receive a cascode voltage Vcascode, and a drain terminal coupled to a first amplifier output node 74. Transistor M6 may have a source terminal coupled to the drain terminal of input transistor M2, a gate terminal configured to receive cascode voltage Vcascode, and a drain terminal coupled to a second amplifier output node 76. Output nodes 74 and 76, sometimes referred to as amplifier output terminals, serve collectively as the differential output port of amplifier 51. Voltage Vcascode may have some intermediate bias voltage level between ground voltage level Vss and a positive power supply voltage Vdd. If desired, voltage Vcascode may also be equal to positive power supply voltage Vdd.

Transistors M5 and M6 interposed between the drain terminals of the input transistors and the amplifier output terminals 74 and 76 in this way are sometimes referred to collectively as cascode transistors. A "cascode" transistor (stage) can refer to and be defined herein as an amplifier stage with an amplifying transistor having its gate terminal coupled to a common (fixed) voltage source (e.g., Vcascode). The cascode transistor stage with M5 and M6 may be used to increase the output impedance of amplifier 51 and can optionally be used to provide different gain steps (e.g., by selectively adjusting the drive strength of transistors M5 and M6). The use of cascode transistors M5 and M6 are optional. If cascode transistor M5 were to be omitted, the drain terminal of input transistor M1 can be directly connected to output node 74. If cascode transistor M6 were to be omitted, the drain terminal of input transistor M2 can be directly connected to output node 76.

The output terminals 74 and 76 of radio-frequency (RF) amplifier 51 can be coupled to one or more antenna(s) 42 via an output network such as output network 92. Output network 92 can be an impedance matching circuit configured to provide proper impedance matching at the interface between the output of amplifier 51 and antenna 42. Output network 92 can be implemented as a transformer having one or more primary coils (windings) 94 and one or more secondary coils (windings) 96. The primary coils 94 can have a first terminal coupled to amplifier output node (terminal) 74 and a second terminal coupled to amplifier output node (terminal) 76. The secondary coils 92 can have a first terminal coupled to antenna 42 and a second terminal coupled (shunted) to ground line 62. Such type of output network 92 implemented using a transformer is thus sometimes referred to as a transformer based matching network. In particular, the transformer based matching network 92 of FIG. 3 has an input (primary) side configured to receive differential signals from amplifier 51 and has an output (secondary) side with one end shunted to ground 62 (e.g., the secondary side is single-ended). Such type of transformer where one side is differential while the other side is single-ended is sometimes referred to as a balun. Output network 92 of this type is thus sometimes also referred to as a balun based matching network.

The performance of a radio-frequency power can be quantified by a parameter known as error vector magnitude (EVM). Ideally, a signal transmitted by an amplifier would have signal modulation constellation points at certain ideal locations on a complex plane. Due to design imperfections, distortion, spurious signals, and/or noise, however, the actual constellation points often deviate from the ideal locations. Error vector magnitude is a measure of how far the actual points deviate from the ideal locations. In other words, EVM is a metric for quantifying the performance of a transmitted signal by comparing a received signal with an ideal or reference signal in a complex plane. A lower EVM indicates a better signal quality, whereas a higher EVM indicates a poorer signal quality.

Amplifiers, in general, have a linear operating range and a non-linear operating range. To avoid signal distortion, amplifiers are often operated in the linear range. When operated in the non-linear range, the ratio of input power to output power may not be constant. Thus, as the input signal amplitude increases, a disproportionate increase in the output signal amplitude and/or phase may occur. The non-linear behavior of such system can be characterized by a metric sometimes referred to as amplitude modulation to amplitude modulation (AMAM), which describes how the amplitude of the output signal varies as a function of the amplitude of the input signal. The AMAM metric or response thus characterizes any non-linear amplitude distortion associated with the amplifier; AMAM is thus sometimes referred to herein as amplitude distortion. The non-linear behavior of such system can also sometimes be characterized by a related metric sometimes referred to as amplitude modulation to phase modulation (AMPM), which describes how the phase of the output signal varies as a function of the amplitude of the input signal. The AMPM metric or response thus characterizes any non-linear phase distortion associated with the amplifier; AMPM is thus sometimes referred to herein as phase distortion. The AMAM and AMPM responses can sometimes be referred to herein as non-linear distortion responses.

The desired AMAM and AMPM response of amplifier 51 can vary depending on its current mode of operation. Radio-frequency amplifier 51 can be configured to operate using a variety of different modulation schemes. For example, amplifier 51 can be configured to support orthogonal frequency-division multiplexing (OFDM) modulation schemes, including but not limited to binary phase shift keying (BPSK), quadrature phase shift keying (QPSK), 8-quadrature amplitude modulation (8-QAM), 16-quadrature amplitude modulation (16-QAM), 32-quadrature amplitude modulation (32-QAM), 64-quadrature amplitude modulation (64-QAM), 128-quadrature amplitude modulation (128-QAM), 256-quadrature amplitude modulation (256-QAM), 512-quadrature amplitude modulation (512-QAM), 1024-quadrature amplitude modulation (1024-QAM), and/or other wireless modulation schemes.

Different wireless modulation schemes prefer different types of AMAM/AMPM responses. In other words, a first wireless modulation scheme might require a first type of AMAM and/or AMPM response, whereas a second wireless modulation scheme might require a second type, different than the first type, of AMAM and/or AMPM response. For example, modulations schemes such as QPSK, BPSK, and/or low order QAMs (e.g., 8-QAM or 16-QAM) might require some amount of peaking in the AMAM and/or AMPM response for optimal EVM. In contrast, modulation schemes such as higher order QAMs (e.g., 256-QAM, 64-QAM, 128-QAM, 512-QAM, 1024-QAM, etc.) might require a flat AMAM/AMPM response without any peaking for optimal EVM. Thus, an AMAM or AMPM response that is suitable for one modulation scheme might not be suitable for another modulation scheme.

In accordance with an embodiment and still referring to FIG. 3, amplifier 51 can be provided with an impedance tuning circuit such as a common mode impedance tuning circuit 80. As shown in FIG. 3, common mode impedance tuning circuit 80 can include a first capacitor 84, a second capacitor 86, and a switch 88. Capacitors 84 and 86 can be referred to as tuning capacitors or impedance tuning capacitors (components). Capacitors 84 and 86 can be fixed or adjustable capacitors. Capacitors 84 and 86 should have identical capacitance values. The first impedance tuning capacitor 84 may have a first terminal coupled to the first amplifier output node 74 and a second terminal coupled to a tail node 90. The second impedance tuning capacitor 86 may have a first terminal coupled to the second amplifier output node 76 and a second terminal coupled to tail node 90. Configured in this way, the tail node 90 serves as a midpoint between the differential output nodes 74 and 76 and is thus considered a virtual ground. In analog (small) signal processing, the term "virtual ground" can refer to and be defined herein as a point in a circuit that is maintained at a stable voltage or reference level but is not physically connected to a ground line.

Switch 90 may be a n-type transistor (e.g., an NMOS device) having a drain terminal coupled to the virtual ground node 90, a source terminal coupled to ground line 62, and a gate terminal configured to receive a control signal Scontrol from an associated control circuit such as controller 82. Controller 82 can represent a controller within processing circuitry 26 (FIG. 2), a controller within transceiver 28, a controller within front-end module 40, some controller within wireless circuitry 24, or other controller within control circuitry 14 of FIG. 1. Controller 82 can be configured to assert signal Scontrol (e.g., to drive Scontrol to a logic "1") to selectively activate transistor 88 or to deasserted signal Scontrol (e.g., to drive Scontrol to a logic "0") to deactivate transistor 88.

Figure 4:
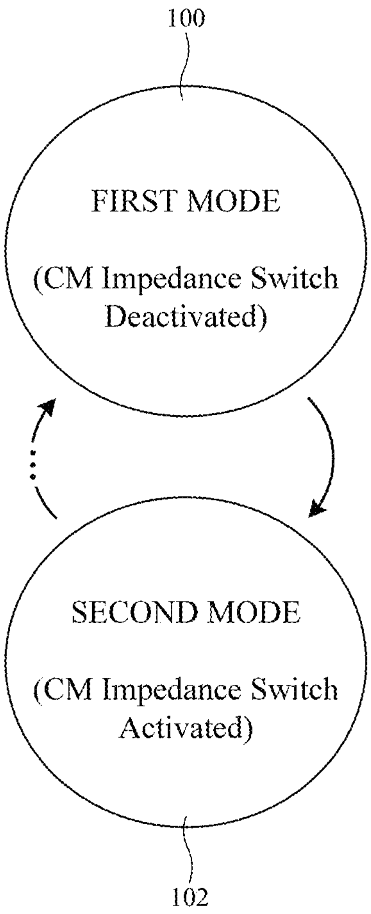
FIG. 4 is a state diagram showing how the amplifier shown in FIG. 3 is operable in various modes in accordance with some embodiments.

The state of switch/transistor 88 can depend on the current mode of operation of amplifier 51. FIG. 4 is a state diagram showing how amplifier 51 of the type described in connection with FIG. 3 can be operable in various modes in accordance with some embodiments. As shown in FIG. 4, radio-frequency amplifier 51 can be operable in at least a first mode 100, and a second mode 102. This example in which amplifier 51 is operable in two modes is illustrative. In general, amplifier 51 can be operable in two or more different modes or operating conditions, three or more modes or operating conditions, four or more modes or operating conditions, five to ten modes or operating conditions, or more than ten modes or operating conditions.

Figure 5:
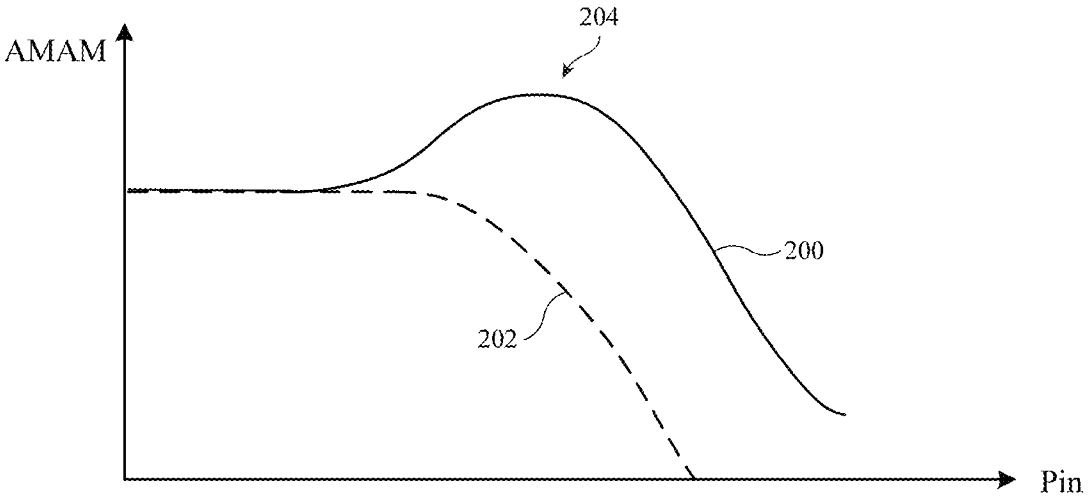
FIG. 5 is a diagram plotting an amplitude modulation to amplitude modulation (AMAM) response as a function of amplifier input power in accordance with some embodiments.
Figure 6:
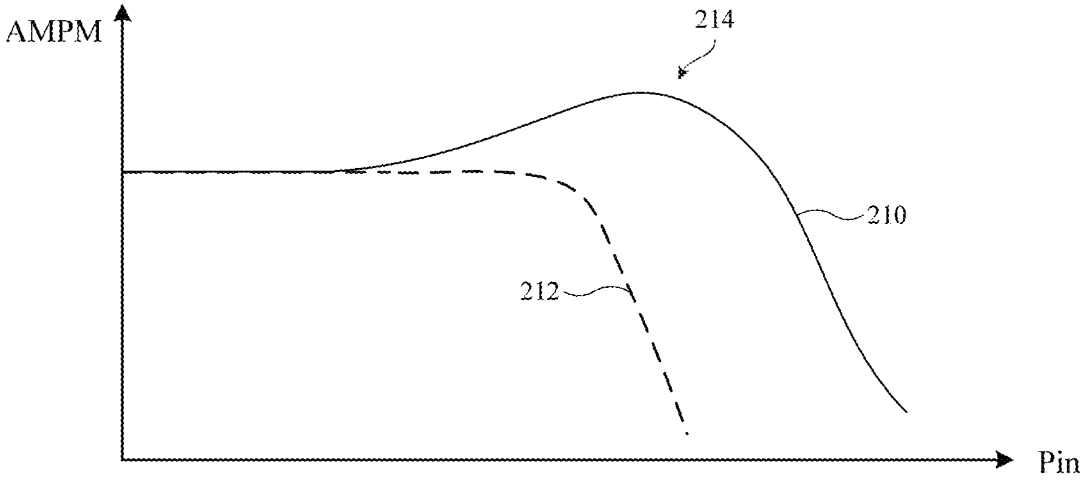
FIG. 6 is a diagram plotting an amplitude modulation to phase modulation (AMPM) response as a function of amplifier input power in accordance with some embodiments.

In the first mode 100, switch 88 can be deactivated (turned off). When switch 88 is off, node 90 exhibits high common mode impedance (e.g., like an open circuit), so capacitors 84 and 86 can appear to be disconnected from nodes 74 and 76 for common mode signals. Effectively removing the loading of the tuning capacitors 84 and 86 in this way can produce an AMAM response and AMPM response with some amount of peaking. FIG. 5 is a diagram plotting an AMAM response as a function of input power Pin of amplifier 51 in accordance with some embodiments. FIG. 6 is a diagram plotting an AMPM response as a function of amplifier input power Pin. As shown in FIG. 5, curve 200 corresponds to the AMAM response of amplifier 51 operating in the first mode 100 when switch 88 is deactivated, where curve 200 exhibits an amount of AMAM peaking 204. As shown in FIG. 6, curve 210 corresponds to the AMPM response of amplifier 51 operating in the first mode 100 when switch 88 is deactivated, where curve 210 also exhibits an amount of AMPM peaking 214. Such AMAM/AMPM peaking 204 and 214 might be suitable for a first set of wireless modulation schemes (e.g., for QPSK, BPSK, and/or other low order QAMs such as 8-QAM or 16-QAM).

Amplifier 51 can alternatively be configured to operate in the second mode 102 during which switch 88 is activated (turned on). When switch 88 is on, node 90 is grounded, so capacitors 84 and 86 can appear to be shunted to nodes 74 and 76, respectively for common mode signals. In other words, capacitor 84 can now load node 74 with its capacitance, whereas capacitor 86 can now load node 76 with its capacitance. Introducing a common mode capacitive loading or impedance in this way can produce an AMAM response and AMPM response that is relatively flat (e.g., with minimal peaking or droop). As shown in FIG. 5, curve 202 corresponds to the AMAM response of amplifier 51 operating in the second mode 102 when switch 88 is activated, where curve 202 exhibits a flat (non-peaking) profile. As shown in FIG. 6, curve 212 corresponds to the AMPM response of amplifier 51 operating in the second mode 102 when switch 88 is activated, where curve 212 also exhibits a flat (non-peaking) profile. Such flat AMAM/AMPM responses 202 and 212 might be suitable for a second set of wireless modulation schemes such as higher order QAMs (e.g., 256-QAM, 64-QAM, 128-QAM, 512-QAM, 1024-QAM, etc.) different than the first set of wireless modulation schemes.

Switch 88 that is selectively activated and deactivated to control whether the tuning capacitors 84 and 86 loads the output terminals of amplifier 51 for common mode signals are thus sometimes referred to as a "common mode" impedance tuning switch. In other words, the state of switch 88 modulates the common mode impedance at the output of amplifier 51. Since switch 88 is connected to a virtual ground node 90, the differential mode (small-signal) performance of amplifier 51 is not affected by any adjustment of the common mode impedance provided by tuning circuit 80.

The example of FIG. 3 in which switch 88 is coupled to the ground power supply line 62 is illustrative. If desired, switch 88 can alternatively be implemented as a p-type transistor (e.g., a PMOS device) coupled to a positive power supply line. In general, switch 88 can be coupled to a ground line, a positive power supply line, a reference voltage line, or other static voltage line. The embodiments described herein in which the state of common mode impedance tuning switch 88 is controlled based on a current wireless modulation scheme of a radio-frequency amplifier are exemplary. In general, the state of common mode impedance tuning switch 88 can be controlled based on a current operating frequency, gain mode, temperature, voltage, modulation scheme, a combination of these factors, and/or other operating condition(s) associated with the amplifier.

The methods and operations described above in connection with FIGS. 1-6 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or wireless communications circuitry 24 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in wireless circuitry 24, processing circuitry 18 of FIG. 1, etc.). The processing circuitry may include microprocessors, application processors, digital signal processors, central processing units (CPUs), application-specific integrated circuits with processing circuitry, or other processing circuitry.

The foregoing is illustrative and various modifications can be made to the described embodiments. The foregoing embodiments may be implemented individually or in any combination.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. Wireless circuitry comprising:

an antenna; and a radio-frequency amplifier coupled to the antenna, wherein the radio-frequency amplifier comprises:

a first input transistor having a drain terminal coupled to a first node;

a second input transistor having a drain terminal coupled to a second node; and a common mode impedance tuning circuit coupled between the first and second nodes, wherein the common mode impedance tuning circuit is configured to tune a common mode impedance at the first and second nodes and includes a first capacitor coupled to the first node, a second capacitor coupled to the second node, and a switch having a first terminal directly coupled to the first and second capacitors and a second terminal directly coupled to a power supply line.

2. The wireless circuitry of claim 1, further comprising:

a transformer based output network coupled between the antenna and the radio-frequency amplifier.

3. The wireless circuitry of claim 2, wherein the transformer based output network comprises:

one or more first coils having a first terminal coupled to the first node and having a second terminal coupled to the second node; and one or more second coils having a first terminal coupled to the antenna and having a second terminal coupled to the power supply line.

4. The wireless circuitry of claim 1, wherein the switch comprises a transistor having a gate terminal configured to receive a control signal.

5. The wireless circuitry of claim 4, wherein the control signal is set to a first value when the radio-frequency amplifier is configured to operate in a first mode, and wherein the control signal is set to a second value, different than the first value, when the radio-frequency amplifier is configured to operate in a second mode.

6. The wireless circuitry of claim 1, further comprising:

a third transistor having a gate terminal coupled to a gate terminal of the first input transistor and having a drain terminal cross-coupled to the drain terminal of the second input transistor.

7. The wireless circuitry of claim 6, further comprising:

a fourth transistor having a gate terminal coupled to a gate terminal of the second input transistor and having a drain terminal cross-coupled to the drain terminal of the first input transistor.

8. The wireless circuitry of claim 7, further comprising:

a first resistor having a first terminal coupled to a source terminal of the third transistor and having a second terminal coupled to a source terminal of the first input transistor.

9. The wireless circuitry of claim 8, further comprising:

a second resistor having a first terminal coupled to a source terminal of the fourth transistor and having a second terminal coupled to a source terminal of the second input transistor.

10. The wireless circuitry of claim 1, further comprising:

a first cascode transistor having a source terminal coupled to the drain terminal of the first input transistor, a drain terminal coupled to the first node, and a gate terminal configured to receive a bias voltage.

11. The wireless circuitry of claim 10, further comprising:

a second cascode transistor having a source terminal coupled to the drain terminal of the second input transistor, a drain terminal coupled to the second node, and a gate terminal configured to receive the bias voltage.

12. The wireless circuitry of claim 1, wherein the common mode impedance tuning circuit is configured to:

operate in a first state when the radio-frequency amplifier is configured to process radio-frequency signals using a first wireless modulation scheme; and operate in a second state, different than the first state, when the radio-frequency amplifier is configured to process radio-frequency signals using a second wireless modulation scheme different than the first wireless modulation scheme.

13. A radio-frequency amplifier comprising:

a first input transistor configured to receive a radio-frequency signal;

a second input transistor configured to receive the radio-frequency signal;

a first impedance tuning component coupled to a first output node of the radio-frequency amplifier;

a second impedance tuning component coupled to a second output node of the radio-frequency amplifier; and a switch coupled to a tail node disposed between the first impedance tuning component and the second impedance tuning component, wherein the switch is selectively activated when the radio-frequency amplifier is configured to process signals in accordance with a first set of wireless modulation schemes and is selectively deactivated when the radio-frequency amplifier is configured to process signals in accordance with a second set of wireless modulation schemes different than the first set of wireless modulation schemes.

14. The radio-frequency amplifier of claim 13, wherein the first impedance tuning component comprises a first capacitor coupled between the first output node and the tail node.

15. The radio-frequency amplifier of claim 14, wherein the second impedance tuning component comprises a second capacitor coupled between the second output node and the tail node.

16. An amplifier comprising:

a first input transistor coupled to a first output node;

a second input transistor coupled to a second output node; and a common mode impedance tuning circuit configured to provide a first common mode impedance to the first and second output nodes when the amplifier is operating under a first set of operating conditions, wherein the amplifier exhibits a first distortion response with peaking when the common mode impedance tuning circuit is configured to provide the first common mode impedance; and provide a second common mode impedance, different than the first common mode impedance, to the first and second output nodes when the amplifier is operating under a second set of operation conditions different than the first set of operating conditions, wherein the amplifier exhibits a second distortion response different than the first distortion response when the common mode impedance tuning circuit is configured to provide the second common mode impedance.

* * * * *